(12) United States Patent
Dean et al.

(10) Patent No.: US 6,491,001 B1
(45) Date of Patent: Dec. 10, 2002

(54) FLUID CIRCUIT ARRANGEMENT

(75) Inventors: William Dean, Liverpool (GB); Kenneth George Statham, Wigan (GB)

(73) Assignee: Man B & W Diesel Ltd., Stockport (GB)

(*) Notice: Subject to any disclaimer, the term of this patent is extended or adjusted under 35 U.S.C. 154(b) by 0 days.

(21) Appl. No.: 09/445,609

(22) PCT Filed: Apr. 14, 1999

(86) PCT No.: PCT/GB99/01063

§ 371 (c)(1),
(2), (4) Date: Feb. 8, 2000

(87) PCT Pub. No.: WO99/53178

PCT Pub. Date: Oct. 21, 1999

(30) Foreign Application Priority Data

Apr. 14, 1998 (GB) .............................................. 9807694

(51) Int. Cl.[7] .................................................. F01P 3/12
(52) U.S. Cl. .................................. 123/41.31; 123/41.29
(58) Field of Search ........................... 123/41.29, 41.31, 123/142.5 R, 142.5 E, 41.51

(56) References Cited

U.S. PATENT DOCUMENTS

| | | | |
|---|---|---|---|
| 3,397,684 A | | 8/1968 | Scherenberg et al. |
| 4,367,699 A | * | 1/1983 | Evans ...................... 123/41.33 |
| 4,726,324 A | | 2/1988 | Itakura |
| 4,949,690 A | * | 8/1990 | Maurente et al. ...... 123/142.5 E |
| 5,020,482 A | | 6/1991 | Deutschmann |
| 5,121,714 A | * | 6/1992 | Susa et al. ................ 123/41.29 |
| 5,174,254 A | * | 12/1992 | Humburg ............. 123/142.5 R |
| 5,201,285 A | * | 4/1993 | McTaggart ............... 123/41.29 |
| 5,215,044 A | | 6/1993 | Banzhaf et al. |
| 5,415,147 A | | 5/1995 | Nagle et al. |
| 5,806,479 A | * | 9/1998 | Bauer et al. .......... 123/142.5 R |
| 6,047,676 A | * | 4/2000 | Trapy .................. 123/142.5 R |

FOREIGN PATENT DOCUMENTS

| | | |
|---|---|---|
| DE | 2527872 | 1/1977 |
| DE | 3447182 | 6/1986 |
| DE | 19727277 A1 | 1/1999 |
| EP | 0 251 214 A2 | 6/1987 |
| EP | 0 499 071 A1 | 1/1992 |
| GB | 2 190 175 A | 11/1987 |
| GB | 2 234 343 A | 1/1991 |
| GB | 2 316 445 A | 2/1998 |

* cited by examiner

Primary Examiner—Noah P. Kamen
Assistant Examiner—Jason Benton
(74) Attorney, Agent, or Firm—Kirschstein, et al.

(57) ABSTRACT

The fluid circuit arrangement comprises two circuit S. The first circuit has a heater and a heat exchange means. The second circuit has a heat exchange means, a cooler and a valve device which is responsive to a control means to bring the cooler into circuit in response to the temperature in the first circuit and optionally to other operating parameters.

22 Claims, 3 Drawing Sheets

'Standby' Operation

'Standby' Operation

'Low-Load' Operation

'Normal' Operation

FLUID CIRCUIT ARRANGEMENT

BACKGROUND OF THE INVENTION

The present invention relates to a fluid circuit arrangement which is used for temperature control purposes.

The fluid circuit arrangement may be used in any environment where temperature control is required; such control is to involve not only control of the temperature of the fluid with in the circuit arrangement itself, but of a second fluid passing in, through over or around a heat exchange means of the circuit arrangement.

It should be appreciated that the first fluid and the second fluid may be the same or different but it is particularly envisaged that the first fluid will be a liquid such as water and the second fluid will be a gas specifically air.

Although various uses for the fluid circuit arrangement are envisaged, the invention is particularly applicable in the context of cooling/heating circuits for use in association with prime movers such as diesel engines, internal combustion (i.e.) engines, gas turbines, etc. where the first fluid is water flowing in the circuit arrangement and the second fluid is air which is to be utilised in the combustion process.

To take the specific example of a large horsepower diesel engine the fluid circuit arrangement comprises the main engine temperature control system and includes a heat exchange means which is commonly referred to as a jacket, cooler or radiator whereby heat is removed from the engine to its surroundings. A high power diesel engine will inevitably involve a turbocharging arrangement which involves the introduction into the combustion cylinders via the inlet manifold of air under pressure (charge air) from a compressor. As the air is compressed by the compressor of the turbocharger its temperature is raised. The benefit of the high pressure is substantially reduced if the charge air temperature is allowed to remain at this high temperature and, accordingly, the usual arrangement is to provide a cooling means between the compressor and the inlet manifold. Such cooling means, which is generally referred to as an intercooler or charge air cooler, will involve a heat exchange arrangement through which water is passed to take heat from the charge air passing therethrough, or therearound.

In full load conditions, air leaving the compressor can be at a temperature which may be as high as say 210° C., which temperature is drastically reduced to say 70° C. as the charge of air passes through the intercooler.

It is known to interconnect the circuit for cooling water for the intercooler and the main engine or jacket cooling circuit via a valve arrangement whereby heat from the intercooler circuit may be dissipated via the heat exchange means of the main jacket circuit and heat from both circuits may be dissipated via a cooling means in the intercooler circuit.

However, the known arrangements mean that under certain conditions, e.g., where the engine is first started, too much heat is lost from the system when it would be more efficient to maintain the temperature at a value higher than ambient temperature.

SUMMARY OF THE INVENTION

The present invention seeks to provide a fluid circuit arrangement where the requisite temperature control can be achieved under various operating conditions.

According to the invention there is provided a fluid circuit arrangement comprising a first fluid circuit and a second fluid circuit, an interconnecting means which connects the first circuit and the second circuit, the first circuit and the second circuit having a first fluid for circulation therein, the first circuit comprising a first heat exchange means adapted to exchange heat between the first circuit and its surroundings, the second circuit comprising a cooling means for controlled cooling of the first fluid and a second heat exchange means adapted for the exchange of heat between the second circuit and a second fluid, the second circuit also comprising a valve device which is actuable by a control means responsive to at least the temperature in the first circuit to control the flow of first fluid through the cooling means, and at least one of the first circuit and the second circuit comprising a heating means for heating of the first fluid.

It is preferably arranged that during said controlled cooling, said first fluid circulating in both the first circuit and the second circuit passes through the cooling means.

Both the first circuit and the second circuit may comprise respective said heating means.

The heating means may comprise respective electric heaters provided with respective thermostats.

The control means may also be responsive to the temperature of the second fluid passing through the second heat exchange means.

Preferably the valve device comprises two inlet ports and an outlet port and a valve element movable under control by the control means to progressively close one inlet port as the other inlet port is progressively opened; as the one inlet port is progressively closed and the other inlet port is progressively opened, the first fluid is caused to flow through the cooling means.

The control means may progressively actuate the valve device in response to respective ranges of temperatures in the first circuit or in the second heat exchange means.

The first fluid circulating in the first and second circuits is preferably a liquid.

The interconnecting means may comprise a temperature responsive valve device which operates to interconnect the two circuits at a predetermined temperature and the temperature responsive valve device may be operated progressively to connect the first circuit to the second circuit as the temperature in the first circuit increases over a range of temperatures.

A fluid circuit arrangement as defined above may be combined with a diesel engine. In such a combination the first heat exchange means may comprise a jacket cooling means and the second heat exchange means may comprise an intercooler between a compressor and an inlet manifold of the engine. In a standby condition of the engine, the heating means may operate whereby the temperature of the first fluid in the first circuit is maintained at or above a first predetermined temperature and the temperature of the first fluid in the second circuit is maintained at or above a second predetemined temperature; the second predetermined temperature is higher than the first predetermined temperature, and the control means may be responsive to the temperature in the intercooler and/or the pressure of air in the intercooler and/or the speed of the engine. Further the control means may respond to increasing load of the engine to operate the valve device progressively to bring the cooling means into the circuit whereby the fluid flowing through the second circuit is cooled via the cooling means. Further, the control means may respond to low and/or decreasing load of the engine to operate the valve device progressively to take the cooling means out of circuit.

An embodiment of the invention is shown by way of example in the accompanying drawings.

BRIEF DESCRIPTION OF THE DRAWINGS

The three figures.

DETAILED DESCRIPTION OF THE PREFERRED EMBODIMENTS

Figure 1:
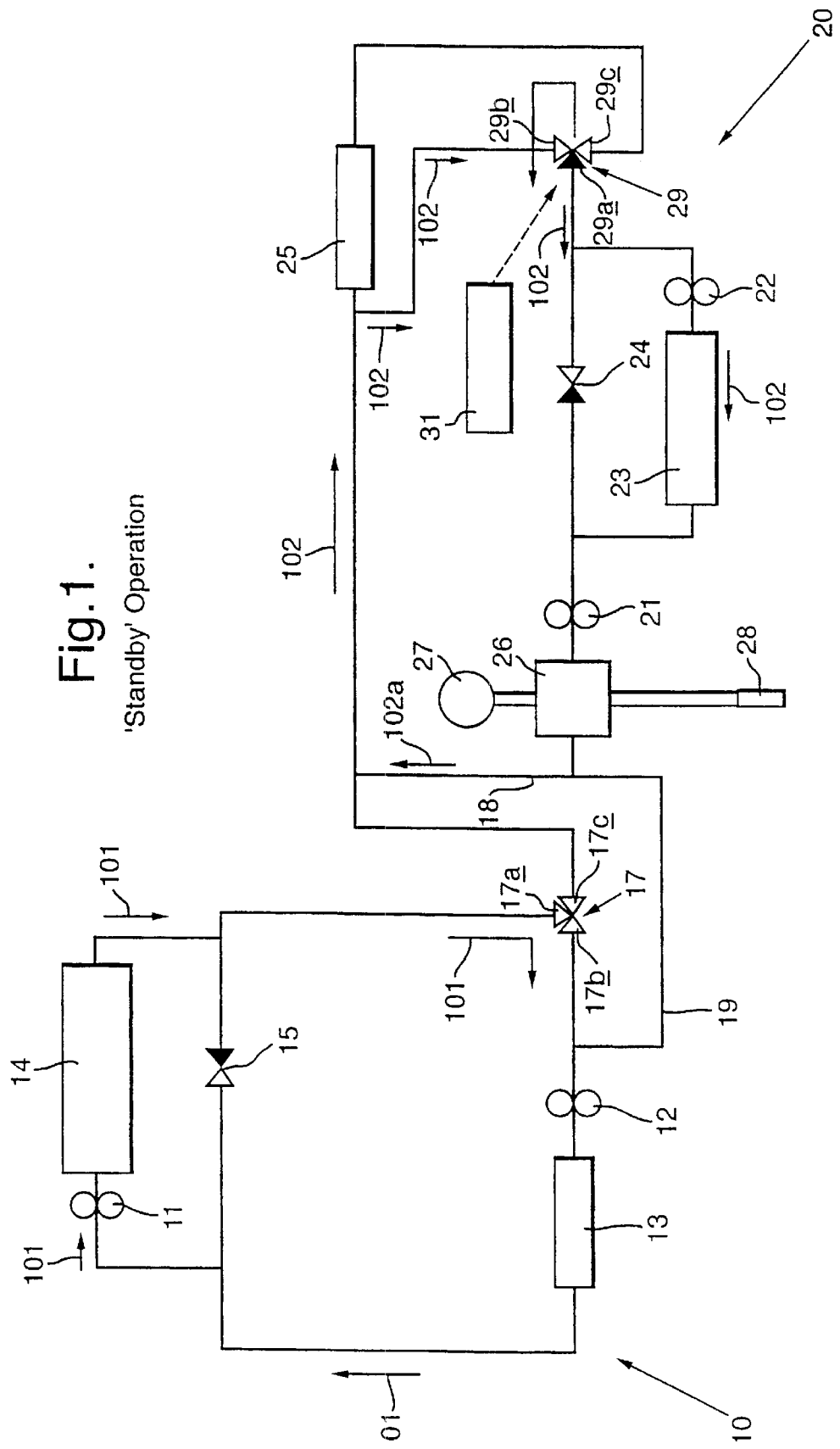
FIGS. 1, 2, 3 illustrate an embodiment of a fluid circuit arrangement particularly for use with a diesel engine.

In FIG. 1 there is shown the basic layout of the circuit arrangement. This Figure also shows the flow of fluid in the first circuit as represented by arrows labelled 101 and in the second circuit by arrows labelled 102, when the engine is in a standby condition. In a standby condition the engine is not actually running but is in a state ready for immediate start-up.

Figure 2:
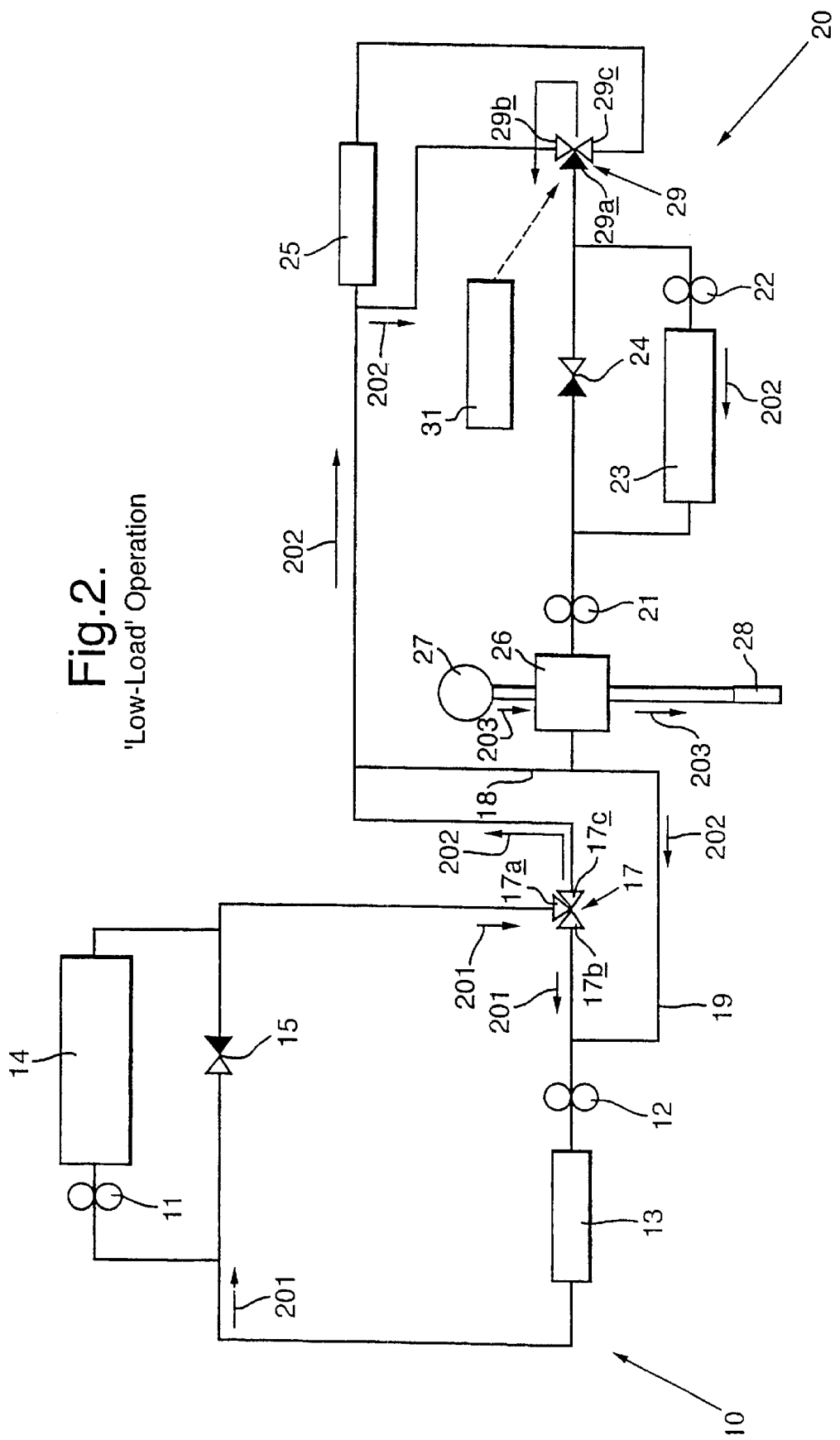

In FIG. 2 the circuit arrangement of FIG. 1 has arrows 201 representing fluid flow in the first circuit and arrows 202 representing fluid flow in the second circuit, when the diesel engine is operating under low and increasing load.

Figure 3:
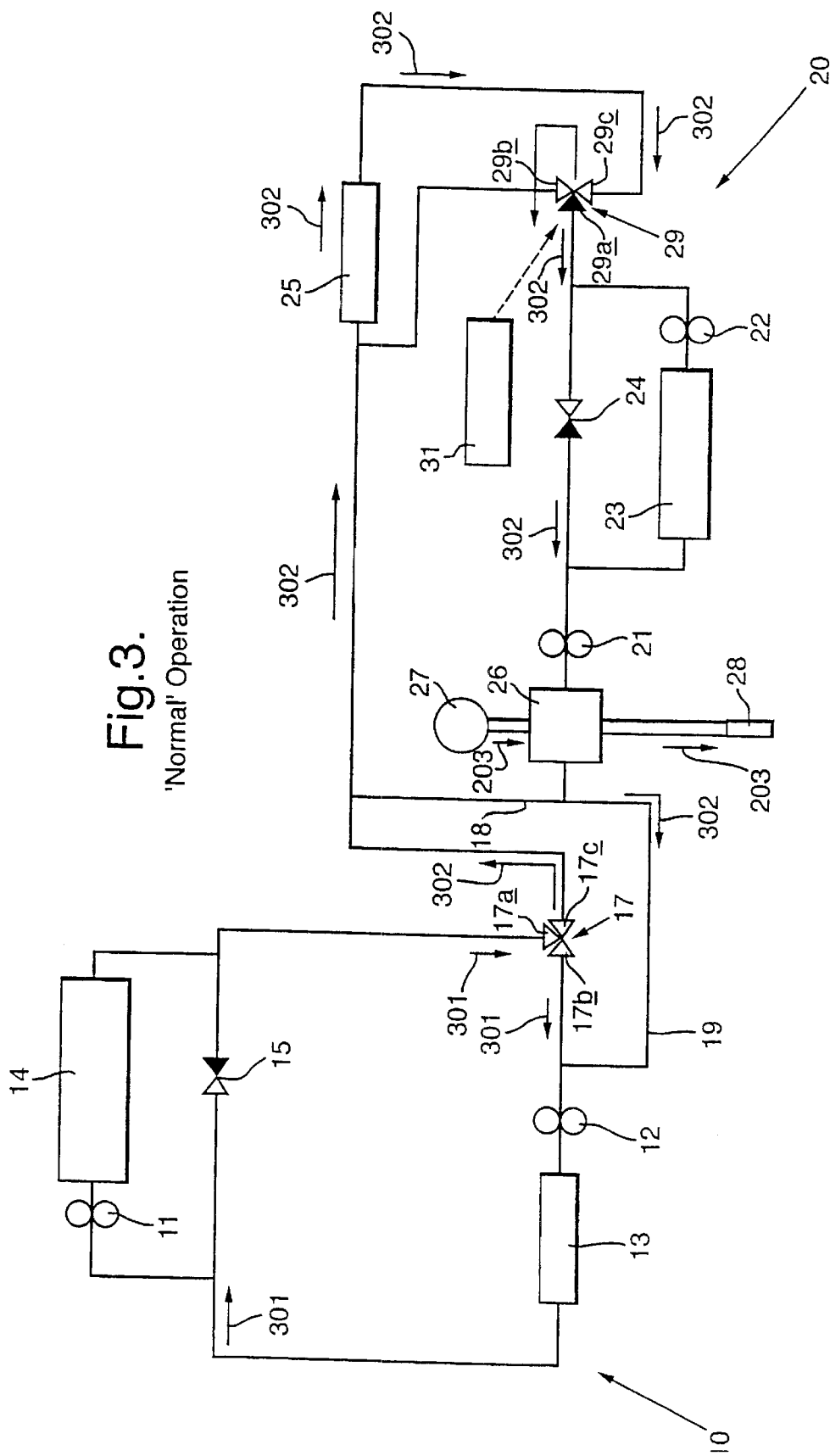

In FIG. 3, arrows 301, 302 represent fluid flow in the first and second circuits respectively when the diesel engine is operating at high load, which would be under normal operation.

The circuit arrangement as illustrated will be described for use with a large horse-power diesel engine, e.g. on a ship, although it may be utilised in other applications, e.g. with i.c. engines, gas turbines and other prime mover or in any other environment where a sophisticated temperature control arrangement is required.

The arrangement comprises a first circuit 10 through which water is caused to circulate by pumps 11, 12 driven by any appropriate means, e.g. by the engine when it is running, or electrically when the engine is on standby. The circuit 10 also incorporates a first heat exchange means 13 (e.g. an engine water jacket) operable for exchange of heat between the circuit 10 and its surroundings (see below).

The circuit 10 also includes a heating means 14, e.g. a suitably-rated electrical heater whereby heat may be added to the circulating water to maintain the temperature of the water at a first predetermined temperature (say 40° C.). To this end the heater has a conventional built-in thermostat so that heating continues until the water reaches the first temperature. Thus for use with a diesel engine the heater 14 is utilised to maintain the temperature at a sufficiently high temperature during standby periods whilst the water is being circulated around the circuit 10. This is done to ensure quick start-up and/or quick build-up of engine power towards full load. The heater 14 has a non-return valve 15 mounted in parallel thereto to prevent back-flow.

The circuit arrangement also includes a second fluid circuit 20 through which water is circulated by pumps 21, 22, which are driven by appropriate means e.g. by the engine when running, or electrically.

The second circuit 20 is connected to the first circuit 10 via an interconnecting means comprising a three-port valve 17 and a line 19.

The three-port valve 17 has an inlet port 17a connected to receive water flowing from heater 14 or engine jacket 13 and when the water is colder than a preset temperature all water flows out through outlet port 17b to continue circulation around circuit 10 through heat exchange means 13. As the temperature rises valve port 17b closes and valve port 17c is opened so that water will flow from circuit 10 into circuit 20 towards cooling means 25 (see below). Although the valve 17 could operate at a preset temperature to change the direction of flow therethrough it is particularly envisaged that the valve will act as a proportional double beat valve having a valve member operable by expandable wax elements. Thus at a first preset temperature, say 75° C., the valve member starts to progressively close off port 17b as port 17c is progressively opened until at a second preset temperature, say 85° C., port 17b is fully closed and port 17c is fully opened. When valve port 17c is open water will flow throughout the second circuit 20, such flow being represented by the arrows 102.

Line 19 constitutes a connecting line between circuit 20 and circuit 10 which permits water to flow back into circuit 10 to make up for water leaving circuit 10 via the opened port 17c. The same quantity of 'cold' water flows back into circuit 10 via line 19 as 'hot' water flows into circuit 20 via valve 17. The pressures in the system ensure that flow in the line 18 which branches from line 19 is in the direction indicated by arrow 102a so that water does not simply flow back into the first circuit via line 18 and 19 without passing through the main part of the second circuit.

The second circuit 20 includes a cooling means 25 in the form of a cooler whereby heat may be dissipated from the circuit 20 and a heat exchange means 26 in the form of an intercooler whereby heat may be added to or taken from the circuit depending on the operating conditions, specifically whether the engine is on standby or on low-load, or increasing-load, or full-load.

The intercooler has compressed air flowing therethrough from the compressor 27 of a turbocharger to the inlet manifold 28 of the cylinders of the diesel engine.

The second circuit also comprises heating means 23 in the form of an electrical heater and a non-return valve 24 mounted in parallel therewith.

The heater 23 has a conventional thermostat and acts to ensure that during standby or low load conditions the water flowing in the second circuit is maintained at or above a second predetermined temperature (say 70° C.) which is higher than the first predetermined temperature (of say 40° C.) for the first circuit under standby or low load conditions. To this end and to prevent heat being lost from circuit 20 in these conditions the cooler 25 is bypassed, while the engine is on standby or on low load, by a valve device 29.

The valve device 29 is shown as a three port (electronically-controlled) valve having an outlet port 29a and two inlet ports 29b, 29c. Control of the valve device 29 is by means of a control means 31 which is responsive to at least the temperature in the first cooling circuit 10. The function of the valve 29 in response to signals from the control means 31 is to selectively bring the cooling means 25 into circuit by closing port 29b and opening port 29c or to take the cooling means 25 out of circuit by opening port 29b and closing port 29c. Rather than simple on-off operation it is envisaged that the valve will operate in a progressive manner, and will comprise a valve member movable rectilinearly, pivotally or rotatably progressively to cover and uncover the inlet ports 29b, 29c.

The control means as well as being responsive to the temperature in the first circuit 10, may also be responsive to various other operational parameters of the diesel engine. Specifically it may be responsive to the temperature of the charge air passing through the intercooler 26 so that if the temperature exceeds a value of say 75° C. the cooler 25 is brought into circuit by operation of the valve 29.

It is particularly advantageous if the control means 31 responds to ranges of temperature. Thus the control means may respond to the temperature of water in the first circuit being in a control range 85°–90° C. and to the charge air temperature being in a control range 75°–80° C., the control means 31 responding on a 'highest wins' basis. By this is meant that the valve will start to progressively operate as soon as one of the temperatures (first circuit water temperature or charge air temperature) enters its respective control range. The valve will only direct all the water to the cooler when one of the temperatures reaches the top of its respective control range or when engine speed/load conditions require full cooling.

There are also provided controls to ensure that the cooler 25 is brought into circuit by operation of the valve 29 should the charge air pressure exceed a preset value or engine speed exceed a preset value in a clutched or loaded condition.

The control means may comprise any suitable arrangement responsive to the parameters indicated to produce a control signal to operate the valve but will generally be an electronic circuit.

The valve 29 is biased to fail-safe to bring the cooler 25 into circuit should the valve fail i.e. valve port 29b is closed and inlet port 29c is opened whereby water circulating in the second circuit 20 passes through cooler 25. Further, loss of a temperature input signal causes the control means 31 to move the valve to its position bringing the cooler 25 into circuit Under such conditions an alarm will operate.

As indicated above, under standby conditions when the engine is not operating but when operation is to be initiated in the immediately foreseeable future, the circuits are kept at their respective standby temperatures by operation of the heating means. In other words, water will be circulating in first circuit 10 at a temperature of 40° C. (see arrows 101 on FIG. 1) and water will be circulating in circuit 20 at a temperature of 65° C. (see arrows 102 on FIG. 1).

When the engine is operated at a low load (see FIG. 2) the temperature of the engine will start to rise and the temperature of water in the first circuit 10 will rise above the 40° C. at which it is maintained under standby conditions so that heater 14 will no longer operate to add heat to the circuit—heat will be lost to the surroundings via the heat exchange means 13 and the valve device 17 will eventually operate to interconnect circuits 10, 20. As the engine is operating under low-load conditions compressed charge air will be moved through the intercooler 26 as indicated by arrow 203 but because the intercooler 26 is transferring heat to the charge air under such conditions, the heater 23 operates to add heat to the circuit 20.

As engine load increases the heat produced by the engine causes the temperature in both circuits 10, 20 to rise, the heater 23 will cease operating and the valve 29 will respond to the temperatures of the first circuit and/or to that of the charge air to progressively close port 29b and open port 29c to ensure flow of the first fluid through the cooling means 25 as shown by arrows 302 on FIG. 3. Valve 29 will control the temperature of the water leaving port 29a such that it is at a temperature sufficiently high to maintain the temperature of the air leaving intercooler 26 at 105° C., say. At high load air 203 entering intercooler 26 will be at high temperature, say 210° C., and the valve 29 will control the temperature of water leaving port 29a to keep it sufficiently low to maintain the temperature of air leaving heat exchanger device 25 at 70° C. This will mean that the heat is taken from the air flowing through the intercooler 26 by the water flowing therethrough and this heat is then dissipated via the cooling mean 25; the cooling means 25 also effects cooling of the water in the first circuit 10 which is connected via opened valve 17 to the second circuit.

It is further envisaged that the control means responds to decreasing load of the engine to operate the valve device 29 progressively to take the cooling means out of circuit and the fluid flowing through the second circuit may then be heated by the heating means 23 if the temperature falls sufficiently.

It is to be understood that the circuit arrangement may also involve means for cooling of the lubrication oil. Where the diesel engine is utilised in a ship, final cooling is to sea water which will constitute at least part of the aforesaid surroundings, the sea water being circulated through the cooling means 25 and heat exchange means 13. In these circumstances the means 13, 25 will typically involve a titanium plate arrangement.

We claim:

1. A fluid circuit arrangement, comprising: a first fluid circuit, a second fluid circuit, an interconnecting means for connecting the first circuit and the second circuit, the first circuit and the second circuit having a first fluid for circulation therein between the first and second circuits, the first circuit comprising a first heat exchange means for exchanging heat between the first circuit and its surroundings, the second circuit comprising a cooling means for controlled cooling of the first fluid and a second heat exchange means for exchanging heat between the second circuit and a second fluid, the second circuit also comprising an actuatable valve device and a temperature responsive control means for actuating the valve device and for controlling a flow of the first fluid through the cooling means to cool the first fluid flowing through the cooling means, and a heating means in at least one of the first and second circuits for heating the first fluid to maintain the temperature of the first fluid at a predetermined temperature, the control means being responsive to a temperature of the second fluid passing through the second heat exchange means.

2. The circuit arrangement as claimed in claim 1, wherein the control means is responsive to a temperature of the first fluid flowing through the first circuit.

3. The circuit arrangement as claimed in claim 1, wherein both the first circuit and the second circuit comprise respective said heating means.

4. The circuit arrangement as claimed in claim 3, wherein said heating means include respective electric heaters provided with respective thermostats.

5. The circuit arrangement as claimed in claim 1, wherein the valve device comprises two inlet ports, an outlet port, and a valve element movable under control by the control means to progressively close one inlet port as the other inlet port is progressively opened.

6. The circuit arrangement as claimed in claim 5, wherein as the one inlet port is progressively closed and the other inlet port is progressively opened, the first fluid is caused to flow through the cooling means.

7. The circuit arrangement as claimed in claim 5, wherein the control means progressively actuates the valve device in response to respective ranges of temperatures of the first fluid in the first circuit and/or of temperatures of the second fluid in the second heat exchange means.

8. The circuit arrangement as claimed in claim 5, wherein the first fluid circulating in the first and second circuits is a liquid.

9. The circuit arrangement as claimed in claim 5, wherein the interconnecting means comprises a temperature responsive valve device which operates to interconnect the first and second circuits at a predetermined temperature.

10. The circuit arrangement as claimed in claim 9, wherein the temperature responsive valve device is operated progressively to connect the first circuit to the second circuit as the temperature in the first circuit increases over a range of temperatures.

11. A fluid circuit arrangement for a diesel engine having standby periods and low-load operation, the arrangement comprising: a first fluid circuit, a second fluid circuit, an interconnecting means for connecting the first circuit and the second circuit, the first circuit and the second circuit having a first fluid for circulation therein between the first and second circuits, the first circuit comprising a first heat exchange means for exchanging heat between the first circuit and its surroundings, the second circuit comprising a cooling means for controlled cooling of the first fluid and a second heat exchange means for exchanging heat between the second circuit and a second fluid, the second circuit also comprising an actuatable valve device and a temperature responsive control means for actuating the valve device and for controlling a flow of the first fluid through the cooling means to cool the first fluid flowing through the cooling means, and a heating means in at least one of the first and second circuits for heating the first fluid to maintain the temperature of the first fluid at a predetermined temperature during the standby periods and the low-load operation, the first heat exchange means comprising a jacket cooling means, and the second heat exchange means comprising an intercooler between a compressor and an inlet manifold of the diesel engine.

12. The circuit arrangement as claimed in claim 11, wherein, in the standby periods of the diesel engine, the heating means operates to maintain the temperature of the first fluid in the first circuit at or above a first predetermined temperature, and to maintain the temperature of the first fluid in the second circuit at or above a second predetermined temperature.

13. The circuit arrangement as claimed in claim 12, wherein the second predetermined temperature is higher than the first predetermined temperature.

14. The circuit arrangement as claimed in claim 11, wherein the control means is responsive to a temperature in the intercooler and/or air pressure in the intercooler and/or engine speed.

15. The circuit arrangement as claimed in claim 11, wherein the control means responds to increasing load of the diesel engine for progressively operating the valve device to enable the first fluid flowing through the second circuit to pass through, and be cooled by, the cooling means.

16. The circuit arrangement as claimed in claim 15, wherein the control means responds to low-load and decreasing load operation, for progressively operating the valve device to cause the first fluid flowing through the second circuit to bypass the cooling means.

17. A fluid circuit arrangement for a diesel engine having standby periods and low-load operation, the arrangement comprising: a first fluid circuit, a second fluid circuit, an interconnecting means for connecting the first circuit and the second circuit, the first circuit and the second circuit having a first fluid for circulation therein between the first and second circuits, the first circuit comprising a first heat exchange means for exchanging heat between the first circuit and its surroundings, the second circuit comprising a cooling means for controlled cooling of the first fluid and a second heat exchange means for exchanging heat between the second circuit and a second fluid, the second circuit also comprising an actuatable valve device and a temperature responsive control means for actuating the valve device and for controlling a flow of the first fluid through the cooling means to cool the first fluid flowing through the cooling means, and a heating means in at least one of the first and second circuits for heating the first fluid to maintain the temperature of the first fluid at a predetermined temperature during the standby periods and the low-load operation, wherein, in the standby periods of the diesel engine, the heating means operates to maintain the temperature of the first fluid in the first circuit at or above a first predetermined temperature, and to maintain the temperature of the first fluid in the second circuit at or above a second predetermined temperature.

18. The circuit arrangement as claimed in claim 17, wherein the first heat exchange means comprises a jacket cooling means, and wherein the second heat exchange means comprises an intercooler between a compressor and an inlet manifold of the diesel engine.

19. The circuit arrangement as claimed in claim 17, wherein the second predetermined temperature is higher than the first predetermined temperature.

20. The circuit arrangement as claimed in claim 17, wherein the control means is responsive to a temperature in the intercooler and/or air pressure in the intercooler and/or engine speed.

21. The circuit arrangement as claimed in claim 17, wherein the control means responds to increasing load of the diesel engine for progressively operating the valve device to enable the first fluid flowing through the second circuit to pass through, and be cooled by, the cooling means.

22. The circuit arrangement as claimed in claim 21, wherein the control means responds to low-load and decreasing load operation, for progressively operating the valve device to cause the first fluid flowing through the second circuit to bypass the cooling means.

* * * * *